7768X
Hart & Holladay,
Thrashing Mach.
Patented Sept 17. 1833.
No specification available
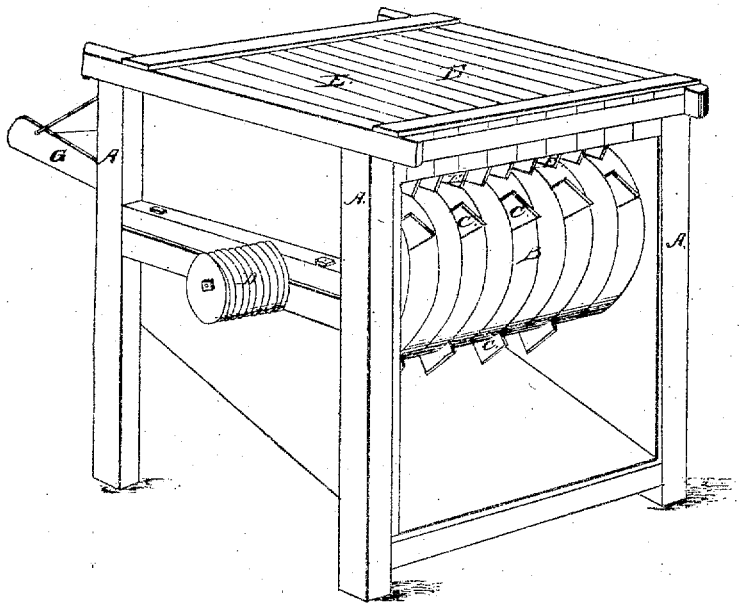

7768X Sept 17, 1833

James Hart and Walter S. Holladay Spotsylvania Virgin[illegible]

Letters Patent

The Schedule referred to in these Letters Patent and making part of the same containing a description in the words of the said James Hart and Walter S. Holladay of their improvement in the construction of the Cylinder and concave of wheat Thrashing Machines.

To all to whom these presents shall come Be it known that we James Hart and Walter S. Holladay of the County of Spottsylvania and State of Virginia have invented a new and useful improvement in the Construction of the Cylinder and Concave of Wheat thrashing Machines and that the following is an exact description of the construction and operation of the said Cylinder and Concave as improved by us.

The axis of the Cylinder is made of a bar of iron one inch and a quarter Square and of sufficient length, for a Cylinder of from two to three feet long; the length of the Cylinder depending upon the horse power which is to be applied, on this axis the Cylinder is thus construc ted. Cut band iron which is from two to three inches wide and from three sixteenths to half an inch thick, into lengths of from sixteen inches to two feet according to the intended diameter of the Cylinder. In the centre of these bars cut a Square hole corresponding in size with the size of the axis Each bar with the hole in it will appear thus

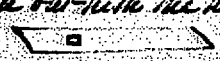

The bar is then put on the axis at the place where the Cylinder commences This being done a circular piece of plank [illegible] inches less in diameter than the length of the bar of iron and of such thickness as may be ne cessary to keep the bars at the required distance from each other with a hole in the centre of the same size with that in the bar. put in like man ner on the axis and pressed close to the bar of iron To make these stand more [illegible] together a groove is cut across the plank corresponding in depth to the thickness of the bar and into this groove the bar is let. This done

[illegible]

1768X another bar similarly made is put on in like manner with this difference only that it is to stand at right angles with the first. Then add another piece of plank formed like the first. In this manner the whole cylinder is constructed each successive bar being fixed at right angles with the preceeding one until as many bars and circular pieces of plank have been put on as may be necessary to make the cylinder of the intended length. To bind the whole cylinder firmly together four rods of iron each half of an inch in diameter are passed through the cylinder from one end of it to the other, one rod through one range of the bars, another through another range &c. about three and a half inches from the ends of the bars or an inch and a half from the outer edge of the circular pieces of plank holes having been previously made through both for that purpose. Screws are cut at the ends of the rods and taps are made adapted to them. These taps screwed tightly on bind the bars and pieces of plank so firmly together that the cylinder cannot be broken by any ordinary force applied to it. To prevent any motion of the cylinder on the axis horizontally strong bars are [illegible] on the axis against the terminating bar at each end of the cylinder. The cylinder is fixed in a box framed as the boxes of threshing machines generally are.

The concave is formed in the following manner. Plank five or six inches wide and of the same thickness with that used in constructing the cylinder is sawed into lengths of about two feet and a half. A segment of a circle is then cut out of each piece as represented in the following figure which gives a lateral view of it the segment begin-ning at A and ending at B

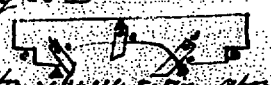

Three iron teeth shown in the representation above given by the figures 1 2 3 each about six inches long and an inch and a half wide and about three Eights of an inch thick are then let into the plank to a depth corresponding with their thickness, between the points A and B the ends of the teeth reaching about two inches below the surface of the concave. Another plank of exactly the same size and form is then added and three similar teeth are let into it at precisely corresponding points. Thus the whole concave is con-structed by adding pieces of plank of like size and form each hav- -ing three iron teeth let into it as shewn above until it has attained the
dimensions required. To bind all together six iron rods each half
an inch in diameter are passed through the plank one through each
range of the iron teeth at the distance of about three inches from the
concave and another behind each range of the iron teeth and as near-
-ly as possible in contact with them so as to support them and at the
distance of about one inch above the concave holes for this purpose having
been previously made. These holes are represented in the above figure
screws are cut at both ends of each rod and taps made fitted to them
these screwed tightly on make the concave as strong as the Cylinder. The
Concave is the segment of a circle having the centre of the Cylinder for
its centre. Shoulders are cut at the ends of the planks which form the
concave. These shoulders are seen at the letters C and D. The Concave is
then let down through the frame of the thrashing box to such a depth
that the teeth of the Concave are three sixteenths of an inch distant from
the surface of the Cylinder the shoulders resting on the upper part of the
frame of the box. To keep it immovable two pieces of timber are laid across
it and firmly fixed there by means of iron bolts which pass down through
them and the plank of the Concave into the frame of the box. The bolts hav-
-ing strong heads at the upper end and screws and taps at the other.
The concave being thus fixed and the Cylinder put in motion the bars
of the latter strike upward passing at the distance of three sixteenths
of an inch from the surface of the Concave and at the same distance
from the teeth on each side. The Cylinder is put in motion by means
of a band passing over a block or wheel fixed on the end of its axis. Any
horse power will do so regulated as to give from six hundred and fifty
to twelve hundred revolutions per minute to the Cylinder; one of small
diameter requiring more revolutions in a given time than one of greater
diameter. The bars of the Cylinder and the teeth of the Concave are so fixed
in the above plan of Construction that they cannot fly off and such is their
size and strength that they cannot be broken by ordinary obstacles found
in the wheat James Hart
Walter S. Holladay Witnesses: Richard Murphy
Charles Todd 1830 [illegible]

(Patented September 9 1831)

[illegible]